(12) United States Patent
Sajassi et al.

(10) Patent No.: US 7,929,554 B2
(45) Date of Patent: Apr. 19, 2011

(54) OPTIMIZED FORWARDING FOR PROVIDER BACKBONE BRIDGES WITH BOTH I AND B COMPONENTS (IB-PBB)

(75) Inventors: Ali Sajassi, San Ramon, CA (US); Francois Edouard Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 12/342,917

(22) Filed: Dec. 23, 2008

(65) Prior Publication Data

US 2010/0158024 A1 Jun. 24, 2010

(51) Int. Cl.
*H04L 12/56* (2006.01)
(52) U.S. Cl. ........................................ 370/401; 370/428
(58) Field of Classification Search .................. 370/230, 370/231, 235, 389, 392, 400, 401, 428
See application file for complete search history.

(56) References Cited

U.S. PATENT DOCUMENTS

| | | | |
|---|---|---|---|
| 6,147,993 A | 11/2000 | Kloth et al. | |
| 6,304,901 B1 | 10/2001 | McCloghrie et al. | |
| 6,553,028 B1 | 4/2003 | Tang et al. | |
| 6,735,198 B1 | 5/2004 | Edsall et al. | |
| 6,807,172 B1 | 10/2004 | Levenson et al. | |
| 6,842,453 B1 | 1/2005 | Kloth et al. | |
| 7,646,778 B2 * | 1/2010 | Sajassi ........................ | 370/401 |
| 7,697,534 B1 * | 4/2010 | Narayanan et al. ........... | 370/392 |
| 2006/0198323 A1 | 9/2006 | Finn | |
| 2006/0227797 A1 | 10/2006 | Chandika et al. | |
| 2007/0025276 A1 | 2/2007 | Zwiebel et al. | |
| 2007/0110024 A1 | 5/2007 | Meier | |
| 2007/0242602 A1 | 10/2007 | Pang et al. | |
| 2009/0109848 A1 * | 4/2009 | Hato et al. .................... | 370/235 |
| 2009/0274148 A1 * | 11/2009 | Tremblay et al. ............. | 370/384 |

\* cited by examiner

*Primary Examiner* — Michael J Moore, Jr.
*Assistant Examiner* — Duc T Duong
(74) *Attorney, Agent, or Firm* — Cesari and McKenna, LLP (57) ABSTRACT

In one embodiment, when a frame is directed to one or more customer instance ports (CIPs) of a switch having received the frame, the frame (a "local frame") may be forwarded on the one or more CIPs based on only a customer space (C-space) lookup operation. Also, if the frame is not directed to any CIPs of the switch, the frame (a "transient frame") may be forwarded on at least one or more provider backbone ports (PBPs) of the switch based on only a backbone space (B-space) lookup operation. For example, a unicast frame may be forwarded based on whether the frame terminates at the switch having received the frame (to a CIP of the switch), while a multicast frame may be forwarded based on determining whether an instance service identifier (I-SID) of the frame maps to a local VLAN ID (L-VID) at the switch (to any CIPs servicing that L-VID).

21 Claims, 7 Drawing Sheets

OPTIMIZED FORWARDING FOR PROVIDER BACKBONE BRIDGES WITH BOTH I AND B COMPONENTS (IB-PBB)

TECHNICAL FIELD

The present disclosure relates generally to computer networks, and, more particularly, to provider backbone bridges (PBBs) with both instance (I) and backbone (B) components, or "IB-PBBs".

BACKGROUND

The operation of Provider Backbone Bridges (PBBs), sometimes referred to as "MAC-in-MAC" or "MAC tunneling" bridges (MAC—Media Access Control), is described by the IEEE standard 802.1ah. Broadly stated, a complete PBB generally comprises a single backbone or "B" component in communication with a backbone network, and one or more instance or "I" components in communication with customer or access networks. In simple terms, the B-component bridges traffic (frames) based on outer MAC addresses (backbone or B-MACs), and the I-component bridges traffic based on inner MAC addresses (customer or C-MACs). Accordingly, for each frame traversing through a PBB bridge with both I and B components (an IB-PBB), two MAC lookup operations are required, namely, one for B-MACs (in a "B-space") and another for C-MACs (in a "C-space"). Due to the often large number of MAC addresses in the network, these two lookup operations can be expensive and burdensome.

BRIEF DESCRIPTION OF THE DRAWINGS

The embodiments described herein may be understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, when a frame is directed to one or more customer instance ports (CIPs) of a switch having received the frame, the frame (a "local frame") may be forwarded on the one or more CIPs based on only a customer space (C-space) lookup operation. Also, if the frame is not directed to any CIPs of the switch, the frame (a "transient frame") may be forwarded on at least one or more provider backbone ports (PBPs) of the switch based on only a backbone space (B-space) lookup operation. For example, a unicast frame may be forwarded based on whether the frame terminates at the switch having received the frame (to a CIP of the switch), while a multicast frame may be forwarded based on whether an instance service identifier (I-SID) of the frame maps to a local virtual local area network (VLAN) identifier (L-VID) at the switch (to any CIPs servicing that L-VID).

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. (Notably, a bridge may also be referred to as a switch, e.g., a Layer-2 switch, which may provide a switching function, and bridge and switch are used interchangeably herein, as understood by those skilled in the art.) Typically, the bridge is a computer and includes a plurality of ports coupled to the LANs or end stations. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to a receiving entity.

Bridges operate at layers of the communication protocol stack, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from one LAN standard (e.g., Ethernet) to another (e.g. token ring). Thus, L3 devices are often used to interconnect dissimilar subnetworks.

Figure 1:
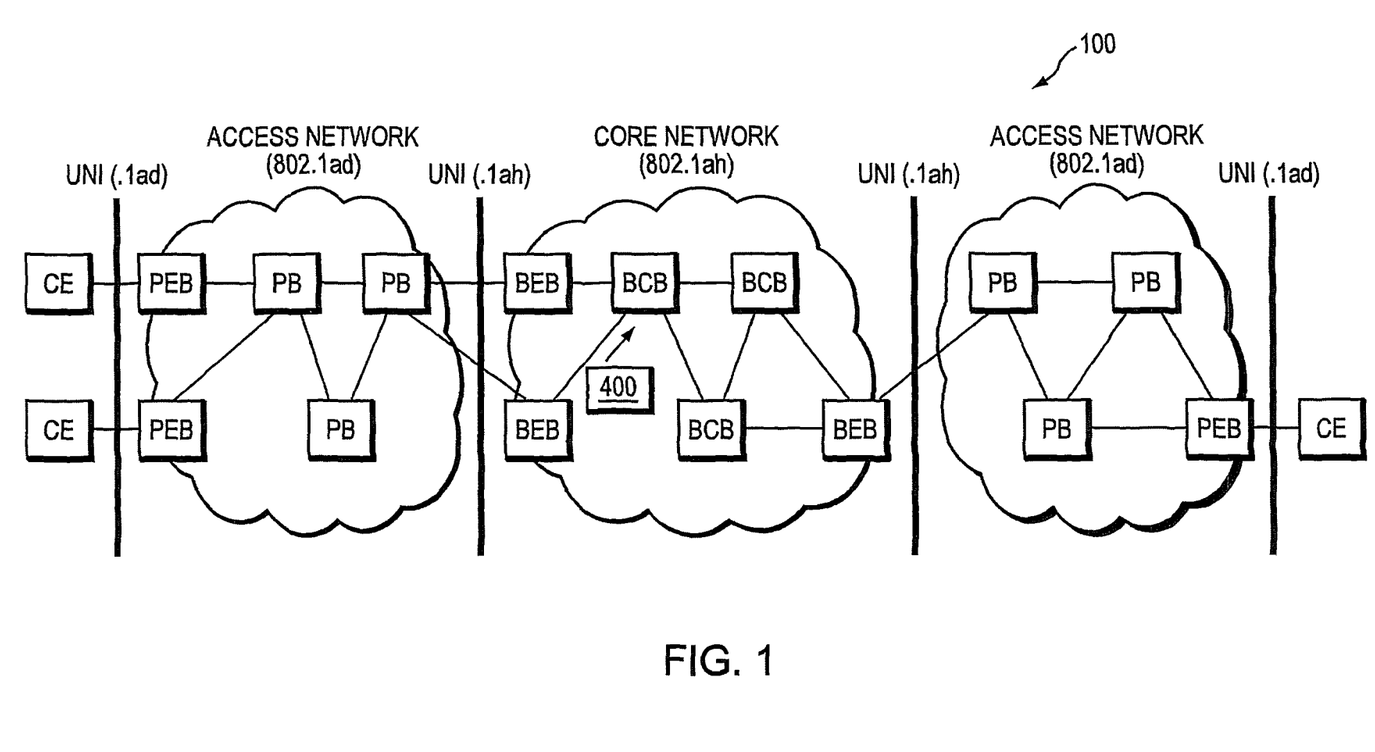
FIG. 1 illustrates an example computer network.

FIG. 1 is a schematic block diagram of an example computer network 100 illustratively comprising nodes/devices, such as bridges and customer equipment (CE) devices. For instance, two access networks (e.g., in accordance with IEEE Std. 802.1ad), which provide access to customers (CEs), may be interconnected with a core network (e.g., in accordance with IEEE Std. 802.1ah). In particular, within the access (or "provider") networks, various provider bridges (PBs) may interconnect provider edge bridges (PEBs) in communication with one or more CEs to the core network, e.g., as shown. Also, within the core network, backbone edge bridges (BEBs) in communication with the access networks (or directly with the customers or CEs where there is no access network, as described below) may be interconnected within the core network by one or more backbone core bridges (BCBs). Frames 400 may be exchanged among the nodes/devices of the computer network 100 using predefined network communication protocols. As such, each bridge includes one or more ports/interfaces for receiving and forwarding the network messages.

Those skilled in the art will understand that any number of nodes, devices, links, etc. may be used in the computer network, and that the view shown herein is for illustration. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network configuration. In particular, as mentioned above (and as shown below in FIGS. 5 and 6), the CEs may be interconnected directly to the core network without an access network (or, alternatively, in FIGS. 5 and 6 below, the access network is simply not shown for clarity). The computer network 100 of FIG. 1 is meant for illustration purposes only and is not meant to limit the embodiments described herein.

Figure 2:
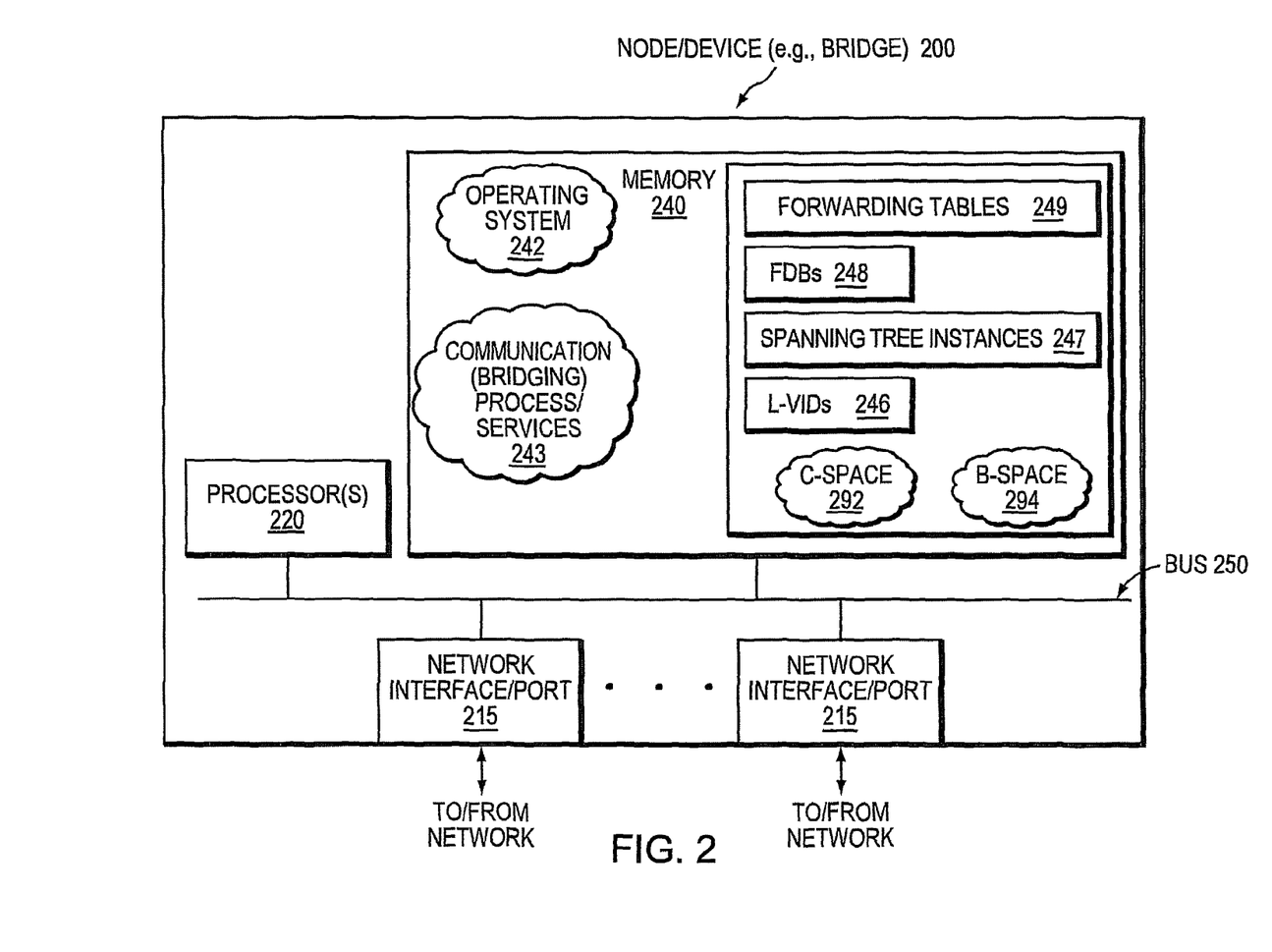
FIG. 2 illustrates an example network device/node.

FIG. 2 is a schematic block diagram of an example node/device 200 that may be advantageously used with one or more embodiments described herein, e.g., as a bridge (or switch), particularly a BEB as used herein. The device comprises a plurality of network interfaces or ports 215, one or more processors 220, and a memory 240 interconnected by a system bus 250. The network interfaces/ports 215 contain the mechanical, electrical, and signaling circuitry for communicating data over physical links coupled to the network 100. The network interfaces/ports may be configured to transmit and/or receive data (frames 400) using a variety of different communication protocols over physical links or wireless links. For example, such communication protocols may include, inter alia, synchronous optical networks (SONET), wireless protocols (e.g., IEEE Std. 802.11), Ethernet (e.g., IEEE Std. 802.3), Fiber Distributed Data Interface (FDDI), etc. Notably, a network interface/port 215 may also be used to implement one or more virtual network interfaces, such as for Virtual Private Network (VPN) access or Virtual LANs (VLANs), as will be understood by those skilled in the art. Illustratively, the handling of frames 400 within the network interfaces/ports 215 may conform to a protocol stack (not shown) that defines the functions performed by the data link and physical layers of a communications architecture.

The memory 240 comprises a plurality of storage locations addressable by the processor(s) 220 and the network interfaces/ports 215 for storing software programs and data structures associated with the embodiments described herein. The processors 220 may comprise necessary elements or logic adapted to execute the software programs and manipulate the data structures, such as forwarding tables 249, filtering databases (FDBs or FIDs) 248, spanning tree instances 247, local VLAN identifiers (L-VIDs) 246, etc. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise communication process/services 243 as described herein. It will be apparent to those skilled in the art that other types of processors and memories, including various computer-readable media, may be used to store and execute program instructions pertaining to the inventive technique described herein.

Communication process/services 243 contain computer executable instructions executed by the processor(s) 220 to perform functions provided by one or more communication protocols, such as various switching/bridging protocols (e.g., thus being referred to herein as "bridging process 243"). These functions may be configured to manage switching databases (e.g., spanning tree instances 247), FDBs 248, or tables 249 containing, e.g., data used to make switching/forwarding decisions, as will be understood by those skilled in the art, and additionally as described herein. In particular, as part of bridging process 243, a spanning tree process (not shown) may execute to perform functions provided by one or more spanning tree protocols (STPs), such as the known Rapid STP (RSTP) and/or Multiple STP (MST). Also, as described herein, portions of the data structures mentioned above (246-249) may be logically organized into a "customer space" or "C-space" 292 or a "backbone space" or "B-space" 294.

Figure 3:
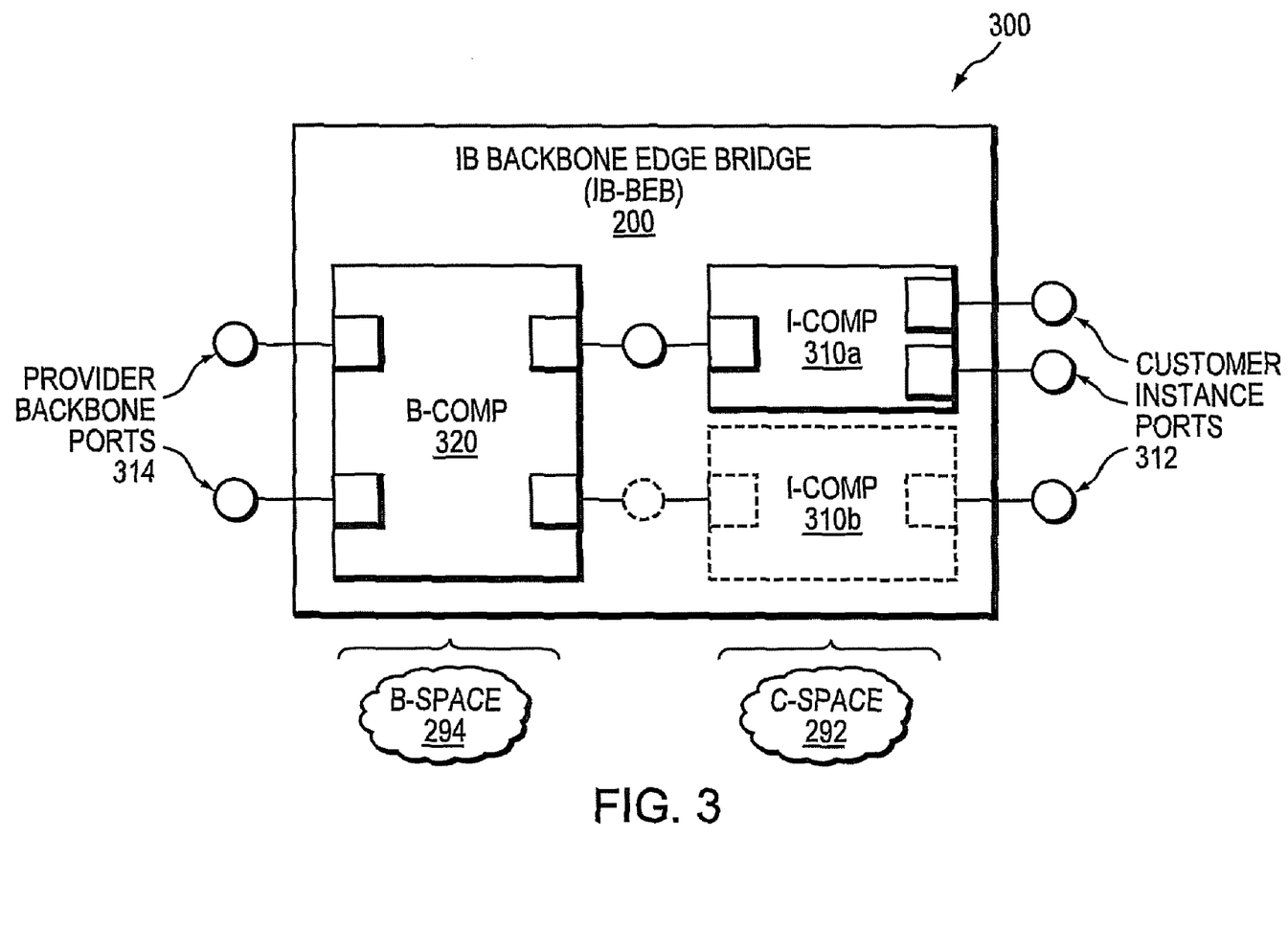
FIG. 3 illustrates an example IB-PBB.

In particular, FIG. 3 illustrates another representative/logical view 300 of device/bridge 200 as a BEB having one or more of both "I-components" 310 and "B-components" 320, thus referred to as an "IB-BEB" (or "IB-PBB", generally), as will be understood by those skilled in the art (e.g., shown as a "distributed architecture" as described below). For instance, ports 215 of an IB-BEB may comprise one or more Customer Instance Ports (CIPs) 312 and one or more Provider Backbone Ports (PBPs) 314, each adapted to send and receive frames. Specifically, CIPs 312 are customer-facing ports communicating with CE devices directly or via one or more access networks (and corresponding devices). Customer Instance components (I-components) 310a,b illustratively each represent a "virtual bridge" (a logical partition of bridge 200/300) adapted to manage CIPs. Conversely, PBPs 314 are backbone-facing ports of the backbone component (B-component) 320, communicating with other backbone devices on the backbone (provider) network. (Illustratively, an internal VLAN or L-VID 246 may include both CIPs 312 and PBPs 314 (ports 215), while a backbone VLAN or B-VLAN includes only the PBPs 314.)

As noted, the operation of IB-PBBs (IB-BEBs) currently requires two MAC lookup operations, namely, one for B-MACs (in B-space 294) at the B-component 320 and another for C-MACs (in C-space 292) at the I-component 310. That is, the B-component 320 bridges traffic (frames) based on outer MAC addresses (backbone or B-MACs), and the I-components 310 bridge traffic based on inner MAC addresses (customer or C-MACs). Notably, while the term C-space is used to describe C-MAC lookups in the I-components 310, those skilled in the art will understand that where IB-BEBs are connected with an 802.1ad access network, the I-components operate in a "Service space" or "S-space." As used herein, "C-space" and "S-space" are used interchangeably, where the difference relates only to whether the I-component is interconnected with a customer network or access network, accordingly.

Figure 4:
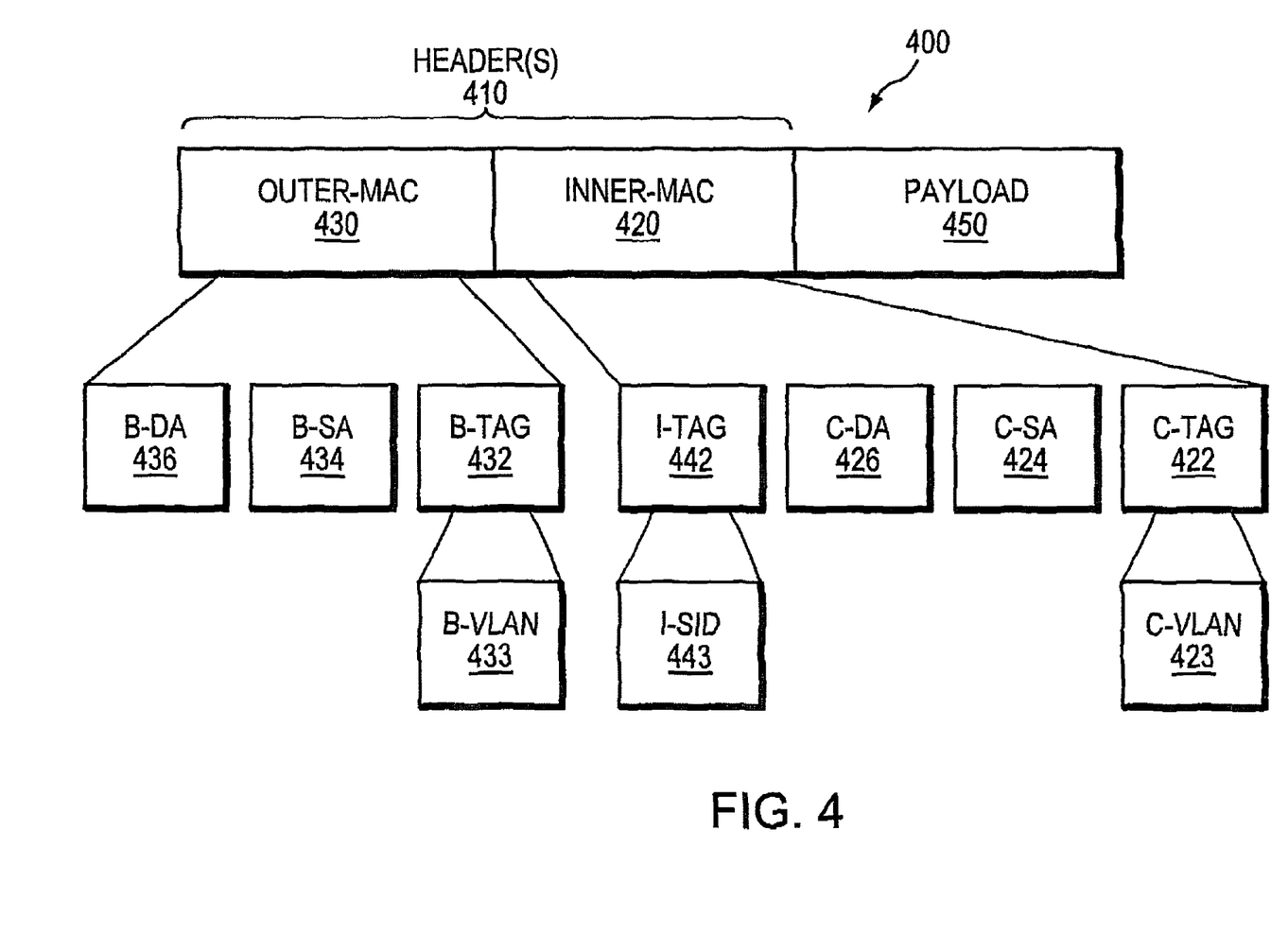
FIG. 4 illustrates an example frame.

As known by those skilled in the art, "MAC-in-MAC" refers to an encapsulation technology that encapsulates an Ethernet frame into another Ethernet frame. For example, FIG. 4 illustrates a simplified frame 400 that may be transmitted within the networks as described herein, and as will be appreciated by those skilled in the art. Frame 400 illustratively comprises a header 410 and a payload (data section) 450. Within header 410 may be various "sub-headers," such as an inner-MAC leader 420 and an outer-MAC header 430.

For instance, for communication between I-components 310 (e.g., of the same or different/remote bridge 300), an inner-MAC (referred to as an "I-MAC," based on the I-component's use) header 420 may be prepended to the frame 400, inner-MAC header 420 comprising a customer "tag" (C-tag, sometimes referred to as an "S-tag") 422 (having a C-VLAN identifier 423), a customer source address (C-SA) 424 from which the frame originated, and a customer destination address (C-DA) 426 to which the frame is destined. (Notably, the C-tag/S-tag 422 may correspond to an "I-tag" 422 with an "I-SID" 443 representing a service identifier, such as a VPN label, as will be understood by those skilled in the art.)

In many networks, the number of customer MAC addresses (C-SAs and C-DAs) could be large (e.g., millions). Accordingly, the bridge 300, an IB-BEB/IB-PBB, may encapsulate the customer addresses of the inner-MAC header 420 with backbone MAC addresses in an outer-MAC header 430 prepended to the frame 400. For instance, outer-MAC header 430 may comprise a backbone tag (B-tag) 432 (having a B-VLAN identifier 433), a backbone source address (B-SA) 434 of the bridge encapsulating the frame, and a backbone destination address (B-DA) 436 of the bridge to which the frame is destined (e.g., in communication with the customer destination device). In this manner, the frame 400 may be "tunneled" through the backbone network between B-components 320 until reaching a bridge 300 having an appropriate I-component 310 in communication with the destination customer device, without having to bridge based on the C-DA 426 of the frame 400, accordingly. (Note that an inner-MAC header 420 is simply a "MAC header" prior to encapsulation, however "inner-MAC" is used herein for simplicity and to distinguish from outer-MAC header 430.)

Due to the nature of MAC-in-MAC, therefore, an IB-BEB/IB-PBB performs one lookup operation based on the B-tag 432 and B-MAC addresses (434/436) in a B-space 294 of the B-component, while another lookup operator is performed on C-tag/S-tag 422 and C-MAC addresses (424/426) in a C-space 292 of the I-components. In other words, for a frame received on a CIP 312, an I-component 310 "looks up" the inner-MAC 420 (C-MAC, C-tag) to determine an appropriate B-DA 436 (and B-tag, I-tag, etc.), encapsulates the frame within an outer-MAC 430, then the B-component 320 looks up the outer-MAC for the proper PBP 314 and transmits/sends the frame 400 into the backbone network. Conversely, for a frame received at a PBP 314, the B-component 320 first looks up the outer-MAC 430 to determine the appropriate I-component based on the B-DA 436 and forwards it to the appropriate I-component 310; where the frame 400 may be decapsulated by removing the outer-MAC 430, then the I-component 310 looks up the inner-MAC 420 for the proper CIP 312 and transmits/sends the frame 400 into the access/customer network. These two lookup operations, however, are expensive in terms of hardware and processing.

Optimized Forwarding on IB-PBBs

According to embodiments of the disclosure, when a frame is directed to one or more CIPs 312 of a switch having received the frame, the frame (a "local frame") may be forwarded on the one or more CIPs based on only a C-space lookup operation. Also, if the frame is not directed to any CIPs of the switch, the frame (a "transient frame") may be forwarded on at least one or more PBPs 314 of the switch based on only a B-space lookup operation. For example, a unicast frame (e.g., 802.1ah encapsulated) may be forwarded using the C-MAC header based on whether the frame terminates at the switch having received the frame (to a CIP of the switch), or using the B-MAC header based on whether the frame doesn't terminate at the switch (a "transient frame").

Conversely, a multicast frame may be forwarded based on whether an I-SID of the frame maps to an L-VID at the switch (to any CIPs servicing that L-VID).

Illustratively, the techniques described herein may be performed by hardware, software, and/or firmware, such as in accordance with a general "bridging" (or "switching") processes/services 243. These processes and/or services may be configured to operate in accordance with certain protocols (e.g., RSTP and/or MST), and in accordance with the techniques described herein.

In particular, the techniques described herein may be utilized by bridges/switches with a "centralized architecture" (such as, e.g., a "Catalyst 3500" or "Catalyst 4500" bridge, available from Cisco Systems, Inc., of San Jose, Calif.), where the bridge can be represented by a single B-MAC address, and frame forwarding may be optimized such that only a single MAC lookup operation is required. For instance, in centralized bridges, only one B-component 320 and one I-component 310a are present on the bridge 300, thus, there is only one I-component and one B-MAC associated with the bridge. Notably, this is unlike a "distributed architecture" shown in FIG. 3 with I-component 310b, e.g., where each I-component may be a separate line card, as may be appreciated by those skilled in the art. For example, non-centralized or distributed architecture bridges (such as, e.g., a "Catalyst 6500" bridge, also available from Cisco Systems, Inc.), may have multiple B-MAC addresses, each corresponding to a different line card or line card module, e.g., each I-component 310.

As described herein, therefore, for bridges with a single I-component 310a (more specifically, with a single B-MAC address), the B-MAC lookup operation can be avoided for frames terminated at the switch and forwarded toward access-facing interfaces (CIPs), and the B-MAC lookup operation is only performed for transient frames (either not terminated at the switch, or needed to be forwarded to other core-facing switches). (Note, however, that multiple B-MACs may be allocated to the bridge, however, it is assumed that all of those B-MAC addresses are used as aliases for the same centralized bridge, and they do not correspond to different parts of the bridge.)

Operationally, the bridges (e.g., IB-PBBs) are configured to handle a number of different types of traffic (frames 400). For instance, traffic types may comprise, inter alia, local unicast traffic for either known or unknown addresses (e.g., in from any port, but out on one (or more) CIPs), transient unicast traffic for either known or unknown addresses (e.g., in from any port, but out on one (or more) PBPs), local multicast/broadcast traffic (e.g., in from any port, out on both CIPs and PBPs), and transient multicast/broadcast traffic (e.g., in from any port, and out on PBPs only, such as where the bridge does not service a VLAN indicated in the frame).

Figure 5:
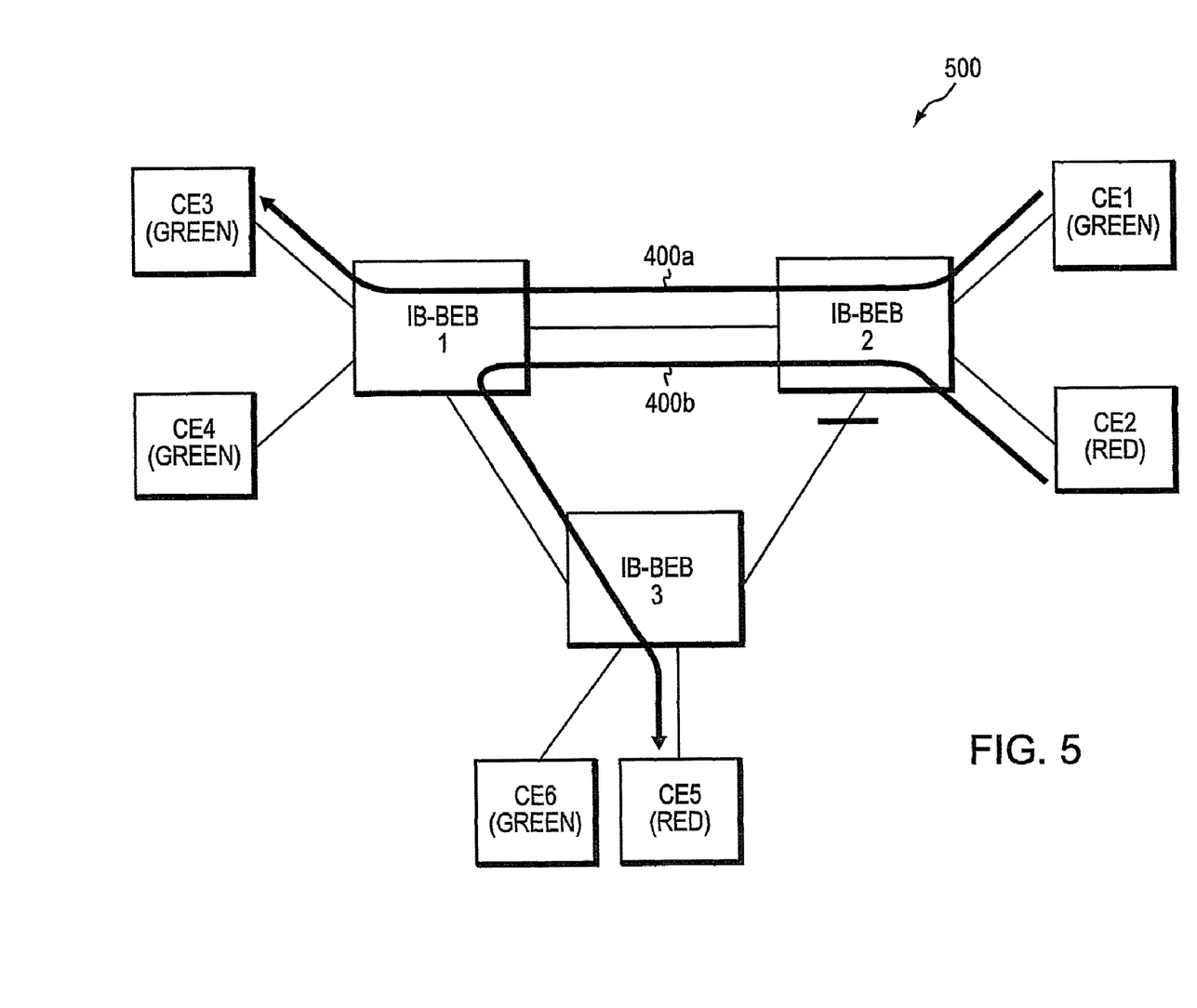
FIG. 5 illustrates an example network with unicast frame transmission.

FIG. 5 illustrates a simplified computer network 500, showing IB-BEBs 1-3 (IB-PBBs) and customer equipment (CEs) 1-6 in an example configuration for the purposes of illustration and discussion. (Notably, access networks as shown in FIG. 1 may still be present between BEBs and CEs, but are not shown for purposes of clarity.) In particular, FIG. 5 shows known unicast frames 400 (after 802.1ah encapsulation) traversing the network from CE 1 to CE 3 (400a), and from CE 2 to CE 5 (400b). (Note that the port between IB-BEB 2 and IB-BEB 3 may be blocked according to spanning tree protocols discussed above.) Also, two VPNs are shown, where each CE belongs to either a "green" VPN (CEs 1, 3, 4 and 6) or a "red" VPN (CEs 2 and 5). From the perspective of IB-BEB 1, and as determined as described herein, frame 400a is a local unicast frame being transmitted out a CIP to a customer device (CE 3), while frame 400*b* is a transient unicast frame being transmitted out a PBP to another provider device (IB-BEB 3).

In accordance with embodiments described herein, an IB-PBB (illustratively IB-BEB 1) receives a unicast frame 400, and determines whether that unicast frame terminates at itself; that is, whether the frame is local or transient. One manner of accomplishing this determination is to compare the B-DA 436 of the received frame to the switch's own B-MAC address, thus determining whether the switch (e.g., IB-BEB 1) is the destination of the frame (note that this is a comparison and not a lookup operation). If there is a match, then the frame is local and terminates at the switch, and if there is not a match, then the frame is transient and does not terminate at the switch.

In response to a local frame terminating at the switch (e.g., frame 400*a*), the I-SID 443 of the frame may be mapped to the L-VID of the switch to determine whether the I-SID is configured on the switch (e.g., "green"). If not, then the frame may be discarded. Otherwise, the handling of the frame may be performed (as follows) in the context of the L-VID, accordingly. In particular, for a local frame 400*a* to be forwarded, any learning of the C-SA 424 and B-SA 434 of the frame is performed in the C-space, and a forwarding lookup operation is performed only in the C-space 292 using the C-DA 426 of the frame to determine an appropriate CIP 312 (e.g., to CE3). (To forward the frame on a CIP 312 to a CE, the B-MAC header 430 is stripped and the L-VID 246 is translated to an C-VID/S-VID prior to transmitting the frame on the CIP to the CE.) Notably, in the event that there is no C-MAC address in the C-space for the C-DA 426 of the frame (a "miss"), one embodiment may restrict flooding of the frame 400 to only the one or more CIPs 312 of the switch (i.e., not flooding the frame to any PBPs 314, as the local frame terminates at the switch).

Conversely, in response to a transient unicast frame not terminating at the switch (e.g., frame 400*b*), then the frame is handled by the B-VLAN. That is, for a transient frame 400*b* to be forwarded, any learning of the B-SA 434 of the frame is performed in the B-space, and a forwarding lookup operation is performed only in the B-space 294 using the B-DA 436 of the frame to determine an appropriate PBP 314 (e.g., to IB-BEB 3).

Figure 6:
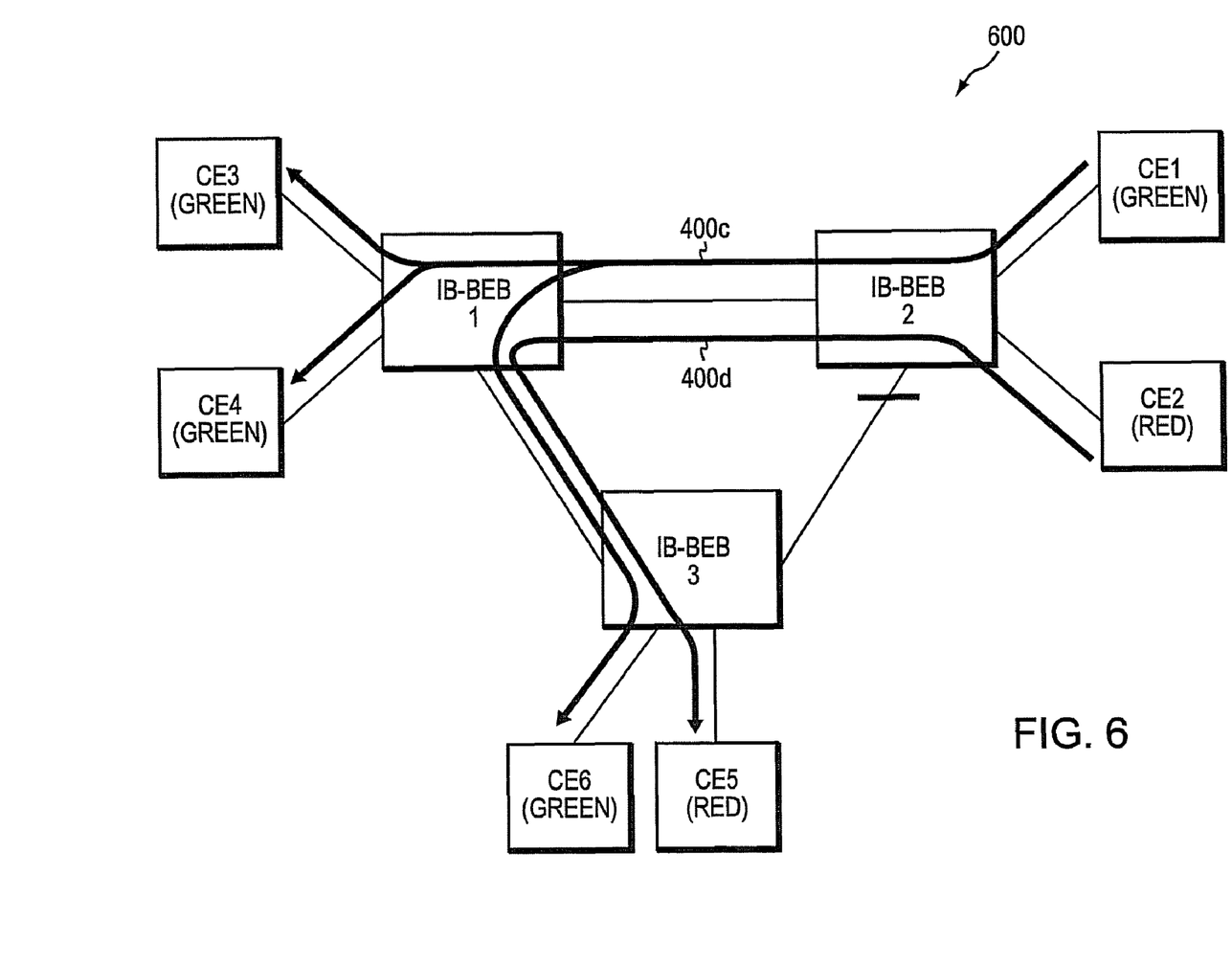
FIG. 6 illustrates an example network with multicast frame transmission.

FIG. 6 illustrates a simplified computer network 600 that is similar to network 500 of FIG. 5; but instead, showing multicast frames 400 traversing the network from CE 1 to CEs 3, 4, and 6 (400*c*), illustratively to the "green" VPN CEs, and from CE 2 to CE 5 (400*d*), illustratively to the "red" VPN CEs. Again, from the perspective of IB-BEB 1, and as determined as described herein, frame 400*c* is a local multicast frame being transmitted out CIPs to customer devices (e.g., CEs 3 and 4) and PBPs (e.g., to IB-BEB 3), while frame 400*d* is a transient multicast frame being transmitted out only PBPs to another provider device (e.g., IB-BEB 3).

In accordance with embodiments described herein, an IB-PBB (illustratively IB-BEB 1) receives a multicast frame 400, and determines whether that multicast frame terminates at itself; that is, whether the frame is local or transient. Since the B-DA 436 of the received frame is a multicast (or broadcast) address, a multicast frame is determined to terminate at the switch if the I-SID 443 of the frame maps to an L-VID serviced by/at the switch. If so (e.g., "green" at IB-BEB 1), then the frame is local and "terminates" at the switch (that is, CEs serviced by the switch are to receive the multicast frame, in addition to any PBPs), and if not (e.g., "red" at IB-BEB 1), then the frame is transient and does not terminate at the switch (that is, only forwarded on PBPs).

In response to a transient frame not terminating at the switch (e.g., frame 400*d*), where the I-SID (L-VID) is not configured on the switch, the multicast frame need only be flooded on the one or more PBPs 314 of the switch (from IB-BEB 1 to IB-BEB 3). Any leaning of the B-SA 434 of the frame (e.g., B-VID and B-MAC) may be performed in the B-space 294. (Note that at the PBPs, filtering may be performed based on an MSTP state for a corresponding B-VLAN 433 of the frame, as may be appreciated by those skilled in the art.)

Conversely, in response to a local multicast frame terminating at the switch (e.g., frame 400*c*), where the I-SID (L-VID) is configured on (serviced by) the switch, a copy of the multicast frame needs to be transmitted/flooded to both CIPs 312 and PBPs 314. As such, learning of the C-SA 424 and B-SA 434 may be performed in the C-space 292, and the frame may be flooded on all receiving PBPs 314, and on one or more CIPs based on the L-VID (e.g., to all "green" CEs).

According to one or more embodiments described herein, therefore, a customer address in the C-space is associated with the address of an I-component in the B-space, thus allowing for a single lookup operation for both unicast and multicast frames. For instance, for unicast forwarding, the frame is switched in the C-space, and is also processed in the C-space at the egress CIPs (for locally terminated unicast frames). For multicast forwarding, the frame is switched in the C-space and is processed in both the C-space and B-space (as necessary) depending on the egress port (that is, in the C-space at a CIP egress port and in the B-space at a PBP egress port). In other words, a single MAC lookup operation may be performed a) in the C-space for certain frames transmitted on CIPs; b) in the B-space for certain frames transmitted on PBPs; and c) flooded in the C-space for certain multicast frames.

Figure 7:
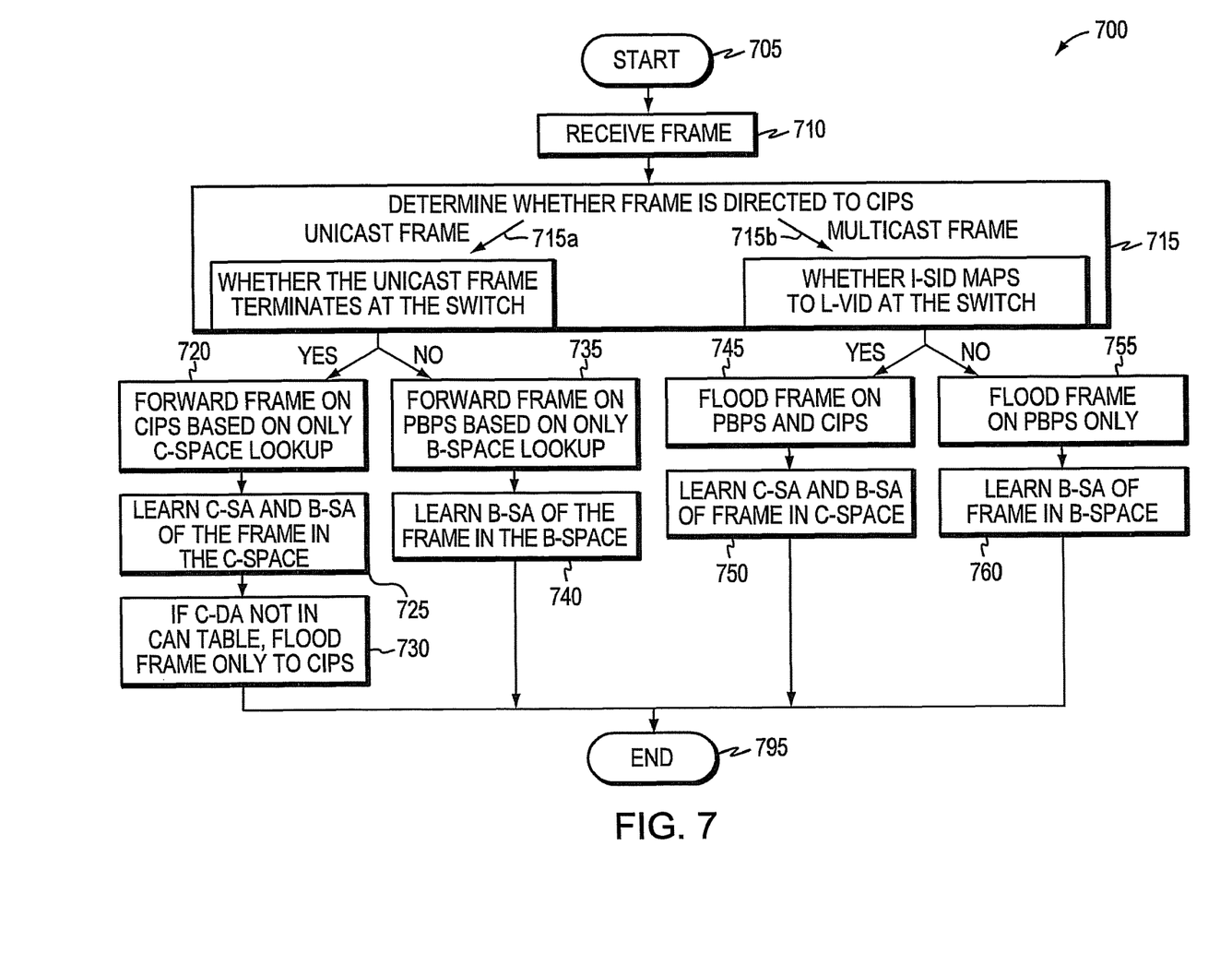
FIG. 7 illustrates an example procedure for optimized forwarding for an IB-PBB.

FIG. 7 illustrates an example procedure for optimizing forwarding on IB-PBBs in accordance with one or more embodiments described herein. The procedure 700 starts at step 705, and continues to step 710, where an IB-PBB (e.g., IB-BEB 1) receives a frame 400. Upon receiving the frame, the switch/bridge may then determine in step 715 whether the frame is "local" (e.g., directed to any CIPs 312 of that switch) or "transient." For instance, as described above, the switch may make this determination based on whether the frame is a unicast frame or a multicast (broadcast) frame, accordingly.

Illustratively, step 715 for a unicast frame includes substep 715*a*, where the determination as to whether the frame is directed to any CIPs of that switch is based on whether the unicast frame terminates at the switch, e.g., whether the B-DA 436 of the frame 400 matches the switch's address (a local frame). If so, then in step 720 the switch forwards the frame on the appropriate CIP(s) 312 based only on the C-space lookup operation into forwarding table 249 (e.g., based on C-DA 426), and any learning from the frame (e.g., the C-SA 424 along with the B-SA 434) may also be performed in the C-space in step 725. Notably, in the event that the C-DA 426 is not in the C-space (i.e., not in the cam table) at the switch after the lookup operation, but the B-DA matches the switch, then the frame may be flooded only to the CIPs 312 of that switch, accordingly (step 730). If, on the other hand, the unicast frame does not terminate at the switch (a transient frame) in step 715*a*, then the frame is forwarded by the switch in step 735 on its appropriate PBP(s) 314 based only on a B-space lookup operation into the forwarding table, and learning (of the B-SA 434, if necessary) is also performed in the B-space in step 740. (Note that if the unicast frame does terminate at the switch, but the I-SID 443 of the frame does not map to any L-VID 246 serviced by CIPs of the switch, e.g., as a step (not shown) after 715a, then the frame may be discarded or forwarded in step 735.)

Conversely, step 715 for a multicast (or broadcast) frame includes sub-step 715b, where the determination as to whether the frame is "local" (e.g., directed to any CIPs of that switch) or "transient" is based on whether the multicast frame contains an I-SID 443 that maps to an L-VID 246 at the switch, that is, whether any CIPs 312 of the switch are associated with the I-SID and are to receive a multicast frame, accordingly. If so, then in step 745 the switch floods the frame on those particular CIPs 312 and on any other PBPs 314 to further broadcast the frame. (In this case, the C-SA 424 along with the B-SA 434 of the frame 400 may be learned in step 750 in the C-space.) If, on the other hand, the I-SID does not map to any L-VID at the switch in step 715b, then the multicast frame 400 is flooded onto only the PBPs 314 of the switch in step 755 (and the B-SA of the frame is learned in the B-space in step 760).

The procedure 700 ends in step 795, having efficiently optimized forwarding of unicast and multicast frames. For example, procedure 700 may optimize forwarding on an IB-PBB by determining which lookup operation is to be performed from either a C-space lookup or a B-space lookup depending on one or more factors described herein.

Advantageously, the novel techniques described herein optimize forwarding on IB-PBBs in a computer network. By efficiently managing the lookup operations performed by the I-components and B-component of the bridge, the novel techniques reduce the number of required MAC lookup operations to one, thereby substantially increasing throughput of a PBB by a factor of two. In particular, the techniques described above reduce implementation complexity considerably, which benefits low-end switches, such as where implementation is done in ASICs (application-specific integrated circuits). That is, the techniques define multiple smaller steps that may be used to avoid a single larger (e.g., expensive) lookup operation.

While there have been shown and described illustrative embodiments that optimize forwarding on IB-PBBs in a computer network, it is to be understood that various other adaptations and modifications may be made within the spirit and scope of the present invention. For example, the embodiments have been shown and described herein using particular terminology and fields based on current standards. However, the embodiments of the invention in their broader sense are not so limited, and may, in fact, be used with other similar technology using different terms and/or standards. Also, while the description above illustrates example network and device configurations, other configurations may be used in accordance with the techniques described herein. For instance, the techniques described herein are well suited for ring topologies in service provider's access and aggregation networks, as well as other types of topologies and networks, as will be appreciated by those skilled in the art. Further, while the frames 400 (e.g., 802.1ah frames) illustrated above in FIGS. 5 and 6 are shown being received on PBPs 314, frames may be handled in a similar manner as received on CIPs 312, accordingly. Moreover, while the term "only" is used to distinguish using a C-space lookup operation from a B-space lookup operation and visa versa, it should be noted that the term "only" as used herein implies not using a B-space lookup operation when using a C-space lookup operation and not using a C-space lookup operation when using a B-space lookup operation, as described herein. In that manner, other operations may be performed during each lookup, with the exception of the converse C-space or B-space lookup operation.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. For example, the embodiments herein may be encoded as logic in one or more tangible media for execution that when executed is operable to perform the techniques described above (e.g., an ASIC). Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining whether a frame is directed to one or more customer instance ports (CIPs) of a switch having received the frame;
   in response to the frame being directed to one or more CIPs, forwarding the frame on the one or more CIPs based on a customer space (C-space) lookup operation at the switch and not using a backbone space (B-space) lookup operation; and
   in response to the frame not being directed to one or more CIPs, forwarding the frame on at least one or more provider backbone ports (PBPs) of the switch based on a B-space lookup operation at the switch and not using a C-space lookup operation.

2. The method as in claim 1, further comprising:
   in response to receiving a unicast frame operation at the switch, determining whether the unicast frame terminates at the switch;
   if terminating at the switch, forwarding the frame on one or more CIPs based on the C-space lookup operation; and
   if not terminating at the switch, forwarding the frame on at least one or more PBPs based on the B-space lookup operation.

3. The method as in claim 2, further comprising:
   in response to the frame terminating at the switch, learning a customer source address (C-SA) and backbone source address (B-SA) of the frame in the C-space.

4. The method as in claim 2, further comprising:
   in response to the frame not terminating at the switch, learning a backbone source address (B-SA) of the frame in the B-space.

5. The method as in claim 2, further comprising:
   determining that there is no customer media access control (C-MAC) address in the C-space for the unicast frame terminating at the switch; and
   in response, flooding the frame to one or more CIPs of the switch and not to PBPs of the switch.

6. The method as in claim 1, further comprising:
   in response to receiving a multicast frame at the switch, determining whether an instance service identifier (I-SID) of the frame maps to a local virtual local area network identifier (L-VID) at the switch;
   if the I-SID does not map to the L-VID, flooding the frame on the one or more PBPs; and if the I-SID maps to the L-VID, flooding the frame on the one or more PBPs and the one or more CIPs.

7. The method as in claim 6, further comprising:
flooding the frame on the one or more CIPs based on the L-VID.

8. The method as in claim 6, further comprising:
in response to the frame not mapping to a L-VID at the switch, learning a backbone source address (B-SA) of the frame in the B-space.

9. The method as in claim 6, further comprising:
in response to the frame mapping to a L-VID at the switch, learning a customer source address (C-SA) and a backbone source address (B-SA) of the frame in the C-space.

10. The method as in claim 6, further comprising:
forwarding the frame on PBPs by filtering the PBPs on which the frame is to be forwarded based on a multiple spanning tree protocol (MSTP) state for a corresponding backbone virtual local area network (B-VLAN) of the frame, and transmitting the frame on the one or more PBPs on which the frame is to be forwarded.

11. The method as in claim 1, further comprising:
forwarding the frame on CIPs by stripping a backbone media access control (B-MAC) header from the frame, translating a local virtual local area network identifier (L-VID) of the frame to a service virtual local area network identifier, and transmitting the frame on the one or more CIPs.

12. An apparatus, comprising:
one or more customer-facing customer instance ports (CIPs) to send and receive frames;
one or more backbone-facing provider backbone ports (PBPs) to send and receive frames;
a processor coupled to the ports and adapted to execute one or more processes; and
a memory to store customer space (C-space) and backbone space (B-space) date structures, the memory further to store a bridging process executable by the processor, the bridging process when executed operable to:
determine whether a received frame is directed to one or more of the CIPs;
forward the frame on the one or more CIPs based on a C-space lookup operation into the data structures and not a B-space lookup operation in response to the frame being directed to one or more CIPs; and
forward the frame on at least one or more of the PBPs based on a B-space lookup operation into the data structures and not a C-space lookup operation in response to the frame not being directed to one or more CIPs.

13. The apparatus as in claim 12, wherein the bridging process is further operable to:
in response to receiving a unicast frame at the apparatus, determine whether the unicast frame terminates at the apparatus;
forward the frame on one or more CIPs based on the C-space lookup operation if the unicast frame terminates at the apparatus; and
forward the frame on at least one or more PBPs based on the B-space lookup operation if the unicast frame does not terminate at the apparatus.

14. The apparatus as in claim 13, wherein the bridging process is further operable to:
in response to the frame terminating at the apparatus, learn a customer source address (C-SA) and a backbone source address (B-SA) of the frame in the C-space data structures; and
in response to the frame not terminating at the apparatus, learn the B-SA of the frame in the B-space data structures.

15. The apparatus as in claim 12, wherein the bridging process is further operable to:
in response to receiving a multicast frame at the apparatus, determine whether an instance service identifier (I-SID) of the frame maps to a local virtual local area network identifier (L-VID) at the apparatus;
if the I-SID does not map to the L-VID, flood the frame on the one or more PBPs; and
if the I-SID maps to the L-VID, flood the frame on the one or more PBPs and the one or more CIPs.

16. The apparatus as in claim 15, wherein the bridging process is further operable to:
in response to the frame not mapping to a L-VID at the apparatus, learn a backbone source address (B-SA) of the frame in the B-space data structures; and
in response to the frame mapping to a L-VID at the apparatus, learn a customer source address (C-SA) and a backbone source address (B-SA) of the frame in the C-space data structures.

17. The apparatus as in claim 12, wherein the CIPs are adapted to interconnect with an access network.

18. The apparatus as in claim 12, wherein the bridging process is organized on the apparatus as a centralized architecture.

19. Logic encoded in one or more non-transitory media for execution and when executed operable to:
determine whether a frame is directed to one or more customer instance ports (CIPs) of a switch having received the frame;
in response to the frame being directed to one or more CIPs, forward the frame on the one or more CIPs based on a customer space (C-space) lookup operation at the switch and not a backbone space (B-space) lookup operation; and
in response to the frame not being directed to one or more CIPs forward the frame on at least one or more provider backbone ports (PBPs) of the switch based on a B-space lookup operation at the switch and not a C-space lookup operation.

20. The logic as in claim 19, when executed further operable to:
in response to receiving a unicast frame at the switch, determine whether the unicast frame terminates at the switch;
if terminating at the switch, forward the frame on one or more CIPs based on the C-space lookup operation; and
if not terminating at the switch, forward the frame on at least one or more PBPs based on the B-space lookup operation.

21. The logic as in claim 19, when executed further operable to:
in response to receiving a multicast frame at the switch, determine whether an instance service identifier (I-SID) of the frame maps to a local virtual local area network identifier (L-VID) at the switch;
if the I-SID does not map to the L-VID, flood the frame on the one or more PBPs; and
if the I-SID maps to the L-VID, flood the frame on the one or more PBPs and the one or more CIPs.

* * * * *

UNITED STATES PATENT AND TRADEMARK OFFICE
CERTIFICATE OF CORRECTION

| | | |
|---|---|---|
| PATENT NO. | : 7,929,554 B2 | Page 1 of 1 |
| APPLICATION NO. | : 12/342917 | |
| DATED | : April 19, 2011 | |
| INVENTOR(S) | : Ali Sajassi et al. | |

It is certified that error appears in the above-identified patent and that said Letters Patent is hereby corrected as shown below:

Col. 5, line 1-2 should read as follows: "(e.g., of the same or different/remote bridge 300), an ~~inner~~ outer-MAC (referred to as an "I-MAC," based on the I-component's"

Signed and Sealed this
First Day of May, 2012

David J. Kappos
*Director of the United States Patent and Trademark Office*